United States Patent [19]
Dulebohn et al.

[11] 3,849,624
[45] Nov. 19, 1974

[54] WIRE ELECTRODE ELECTRIC EROSION DEVICE

[75] Inventors: David H. Dulebohn, Minneapolis; Arney Landy, Jr., St. Paul; Roy Earl Brandt, Columbia Heights, all of Minn.

[73] Assignee: Andrew Engineering Company, Hopkins, Minn.

[22] Filed: May 29, 1973

[21] Appl. No.: 364,830

[52] U.S. Cl. ............................... 219/69 V, 219/69 G
[51] Int. Cl. .............................................. B23p 1/12
[58] Field of Search.......... 219/69 V, 69 G, 121 EB, 219/125 PL; 33/25 R

[56] References Cited
UNITED STATES PATENTS

| | | | |
|---|---|---|---|
| 3,392,262 | 7/1968 | Hansen et al. | 219/121 EB |
| 3,731,043 | 5/1973 | Ullmann et al. | 219/69 V |
| 3,731,044 | 5/1973 | Ullmann et al. | 219/69 V |
| 3,731,045 | 5/1973 | Ullmann et al. | 219/69 V |

*Primary Examiner*—Bruce A. Reynolds
*Attorney, Agent, or Firm*—Lew Schwartz; Wayne A. Sivertson

[57] ABSTRACT

A device for electrically inducing the cutting of a workpiece with a wire electrode. The workpiece and electrode are moved relative to each other such that the electrode follows a predetermined path on the workpiece. The electrode is inclined and orbits about a vertical line in response to changes in the direction of the path on the workpiece. A drive control responds to the gap between the workpiece and electrode to stop their relative movement and the orbiting of the electrode when the gap becomes smaller than a preselected value. When the gap again equals the preselected value, electrode orbiting is enabled followed by the enabling of further relative movement between workpiece and electrode when the electrode orbiting has been completed. Electrode orbiting and relative workpiece - electrode movement remain enabled until the gap again becomes smaller than the preselected value. In this manner, it is possible to electrically induce the cutting of a compound angle in a workpiece so as to directly provide a relief in a die or other similar product.

23 Claims, 7 Drawing Figures

WIRE ELECTRODE ELECTRIC EROSION DEVICE

BACKGROUND OF THE INVENTION

The machining of a workpiece through electrically induced erosion is known to the prior art. Examples of such processes are electric discharge machining and electrochemical machining. In either case, an erosion of the workpiece is accomplished through the application of an appropriate electrical discharge between the workpiece and an electrode, the electrode typically being cylindrical or rod-like having a rotational and vertical oscillatory motion imparted thereto.

One of the more recent advances in the art of electrically induced erosion is the development of a device for cutting a workpiece with a wire electrode. The wire is fed continuously from a supply spool through the workpiece with a potential applied between the workpiece and the electrode in known manner. These devices have enabled the machining of minute and/or intricate patterns with an efficiency not known to other systems. However, the wire electrode devices developed to date have the capacity of cutting only vertically through a workpiece. Among other applications, this has particular disadvantage when the product being produced from the workpiece is a die where advantages of providing a relief through inclined sidewalls are well known. In a die produced using the prior art wire cutting system, it is necessary to employ an additional machining step to effect the relief. This places obvious limitations on the utility of a vertical wire electrode device.

BRIEF SUMMARY OF THE INVENTION

The present invention provides an electrical induction device having an inclined wire electrode for the purpose of cutting a workpiece so as to provide a nonvertical cut. This is accomplished through the provision of a unique electrode guide system which inclines the electrode within a vertical plane and maintains that plane in a predetermined relationship with the direction of relative movement between the electrode and workpiece. In this manner, the automatic provision of a relief in a die, for example, is made possible without the necessity of additional machining.

The many objects, advantages, and novel features of the present invention will become apparent from the following detailed description of the invention when considered in conjunction with the accompanying drawings.

BRIEF DESCRIPTION OF THE DRAWINGS

FIG. 6 is a cutaway view of one of the components of FIG. 5.

DETAILED DESCRIPTION OF THE PREFERRED EMBODIMENT

Figure 1:
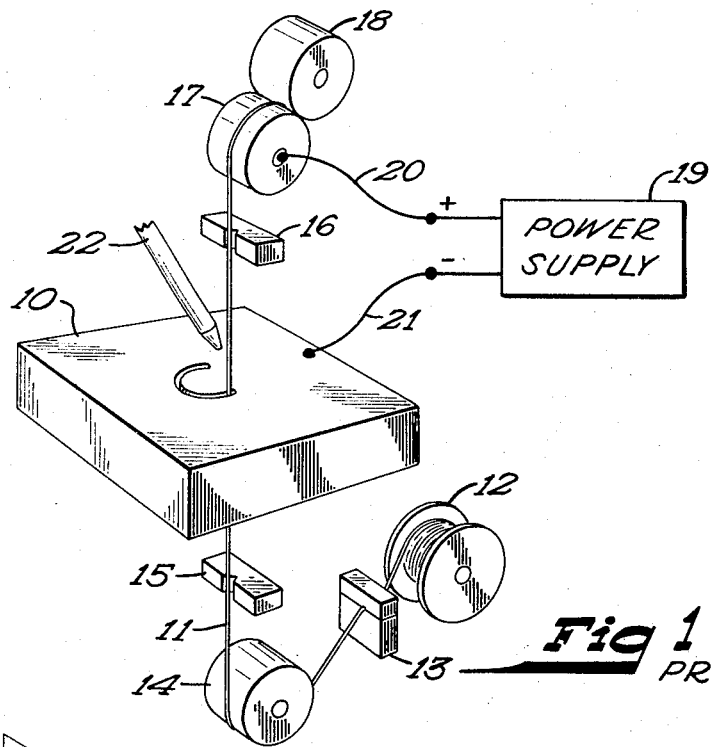
FIG. 1 is an illustration of a prior art wire electrode electrical induction device.

FIG. 1, which illustrates a prior art wire electrode electrical erosion device, shows a workpiece 10 having a wire electrode 11 passing therethrough. The wire electrode 11 is supplied from a supply spool 12 and passes through a tensioning device 13, over a pulley 14, through fixed guides 15 and 16 to where it is clamped between feed rollers 17 and 18. One of the feed rollers 17 and 18 is driven such that wire is continuously drawn off of the supply spool 12 with proper tension being maintained by the tensioning device 13. An electric potential is generated by a power supply 19 and is applied between the workpiece 10 and the electrode 11 by lines 20 and 21. The particular form of the power supply is dependent upon the erosion process being used, the details of the power supply 19 forming no part of the present invention. As is common in electrical erosion processes, a flushing or dielectric fluid, dependent on the erosion process, is directed at the gap between the wire electrode 11 and the workpiece 10, the injection of this fluid being illustrated in FIG. 1 by the nozzle 22. The used wire coming off of the feed rollers 17 and 18 is discarded by known manner.

In operation, the workpiece 10 of the prior art device of FIG. 1 is caused to move in two transverse directions thereby imparting a relative movement between itself and the wire electrode 11. With the proper power supply 19 and fluid directed by the nozzle 22, an electrically induced erosion is created in the direction of relative movement. It is known to supply this system with a gap length sensing means which halts the movement of the workpiece 10 when the gap becomes smaller than a preselected value and to restart the relative movement when the gap has eroded to be equal to or greater than the preselected value. The preselected value is established dependent upon the speed and the quality of the desired machining. As is apparent from FIG. 1, the system illustrated therein is capable of cutting a workpiece only in a vertical manner. This system may be modified to provide an inclined cut relative to the surfaces of the workpiece 10 by inclining either the workpiece 10 or the electrode 11 but, for reasons which will become apparent below, a cutting operation conducted in this manner has a limited utility.

Figure 2:
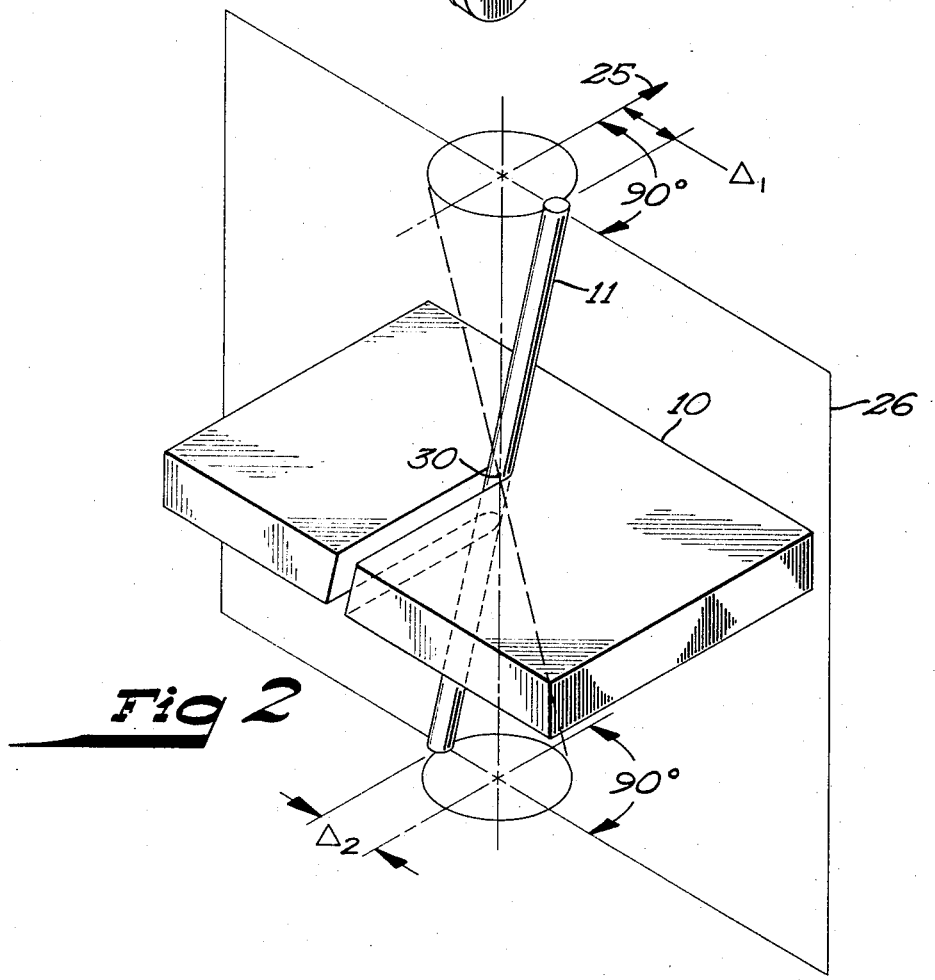
FIG. 2 is an illustration of the concept of the present invention.

Referring now to FIG. 2, there is shown a workpiece 10 such as that illustrated in FIG. 1 and a wire electrode 11. In this illustration, the electrode 11 is considered to be moving in the direction of the arrow 25 with respect to the workpiece 10. The electrode 11 is inclined within a plane 26 which is offset by 90° from the direction indicated by the arrow 25. This inclination is accomplished in this illustration by offsetting the upper portion of the electrode 11 by an amount $\Delta_1$ and the bottom portion by an amount $\Delta_2$. By properly selecting the offset $\Delta_1$ and $\Delta_2$ in conjunction with the lengths of the upper and lower portions of the electrode 11, the point 30 of the electrode 11 which is coincident with the top surface of the workpiece 10 is in the same position with respect to the workpiece 10 as it would otherwise be in if the electrode were not inclined. By maintaining the offsets $\Delta_1$ and $\Delta_2$ constant and the plane 26 displaced by 90° from the direction 25, the electrode 11 will generate a cone as the direction 25 rotates through 360°. The vertex of this cone will coincide with the point 30 and will maintain itself at the top surface of the workpiece 10. Thus, by creating a relative movement between the inclined electrode 11 of FIG. 2, and the workpiece 10 which corresponds to the relative movement between the electrode and workpiece in a system such as that illustrated in FIG. 1, the point 30 will travel an identical path as the entire electrode of the system in FIG. 1 while a point at the bottom surface of the workpiece 10 will be spaced from a vertical line through the point 30 thereby creating an inclined or non-vertical cut. By maintaining the plane 26 in which the electrode 11 is inclined at a displacement of 90° from the travel direction 25, it can be seen that it is possible to electrically induce the cutting of a workpiece such that one surface of the workpiece is cut along a desired path in accordance with a desired pattern while the other surface will have a pattern slightly larger or smaller dependent upon the direction of inclination. In the instance of a die discussed above, this inclination of the electrode 11 makes it possible to directly cut a relief into the sidewall of the die thereby eliminating the necessity for further intricate machining.

Figure 3:
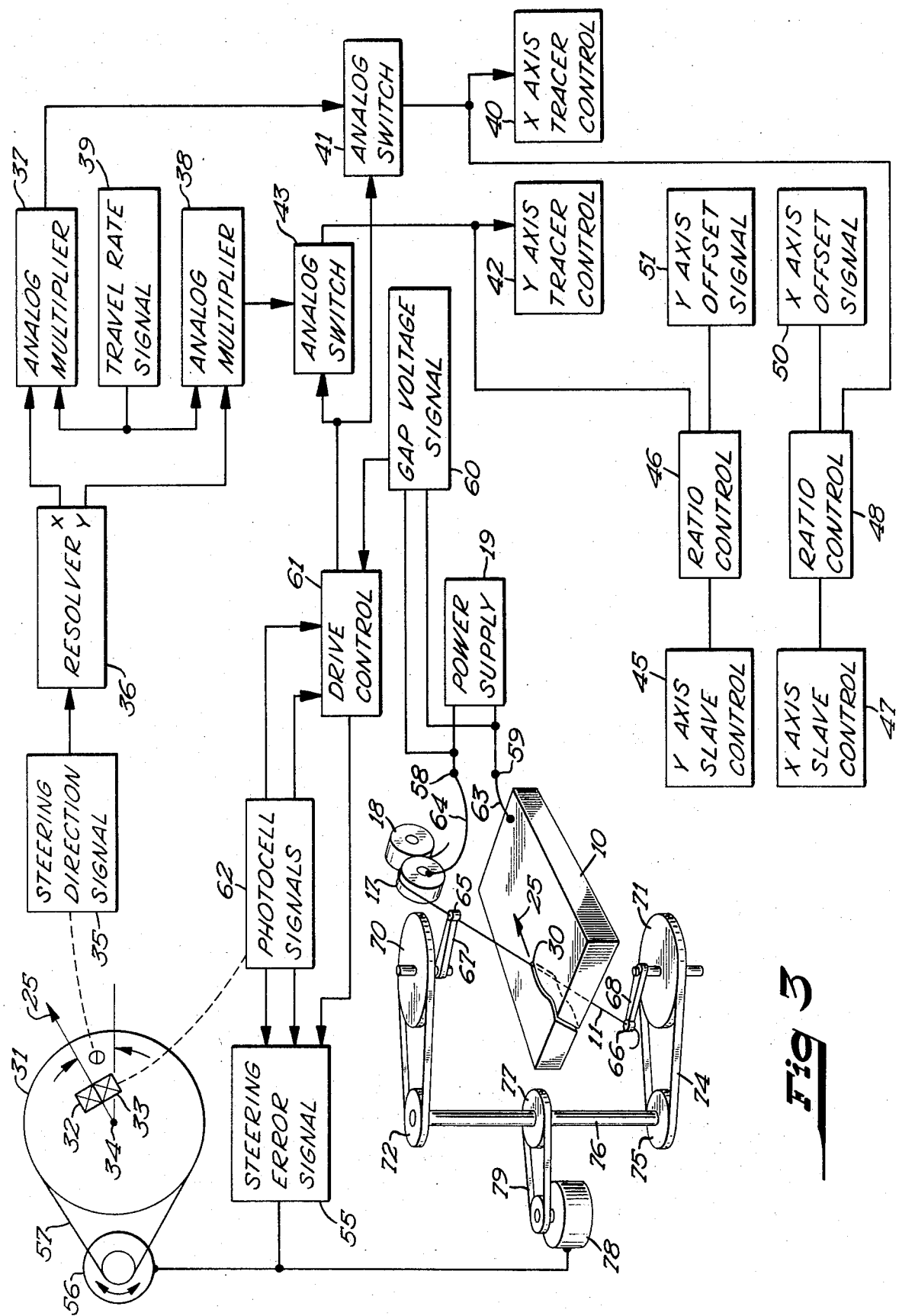
FIG. 3 is an illustration of a preferred embodiment of the present invention and its control system.

Referring now to FIG. 3, there is shown schematically a preferred embodiment of the electrode inclining system of the present invention and a control system therefor. Specifically, there is shown a rotatable spindle 31 having a pair of photocells 32 and 33 spaced from its rotational axis 34. The use of a rotatable spindle such as 31 for the control of an optical tracer and slave machine is known and is described in U.S. Pat. No. 3,493,762 issued Feb. 3, 1970, to David H. Dulebohn. A similar system for the control of an electrically induced erosion device is disclosed in U.S. Pat. No. 3,614,372 issued Oct. 19, 1971 to David H. Dulebohn. Both of these patents are hereby incorporated by reference.

As is described in the incorporated patent disclosure, the orientation of the rotatable spindle 31 is used to generate a steering direction signal at 35. The steering direction signal is resolved at 36 into X and Y components in known manner which are applied to analog multipliers 37 and 38. A travel rate signal is similarly applied to the analog multipliers 37 and 38 as illustrated by 39 which travel rate signal may be manually set or automatically controlled to speed up or slow down the machine upon the occurrence of certain events in known manner. The X component of the travel rate from analog multiplier 37 is applied to an X axis tracer control 40 through an analog switch 41. Similarly, the Y component of the travel rate is applied to a Y axis tracer control 42 through an analog switch 43. The X and Y axis components applied to the tracer controls 40 and 42 may similarly be used to drive a slave machine in known manner. For example, the Y axis component may be applied to a Y axis slave control 45 through a ratio control 46 while the X axis component may be applied to an X axis slave control 47 through a ratio control 48. The ratio controls 46 and 48 are used to compensate for desired enlargements or reductions between the path being followed by the tracer and the desired path to be followed by the slave machine. With the exception of the analog switches 41 and 43, this system is fully disclosed and described in U.S. Pat. No. 3,493,762. Also disclosed in said patent is a system for accomplishing an offset to compensate for the working reach of a tool, for example, said offset being accomplished independently of the tracing head. The offset is accomplished through the generation of an X axis offset signal 50 and a Y axis offset signal 51 which are summed into the X and Y axis components applied to the slave control systems as modified by the ratio controls 46 and 48 in known manner.

The orientation of the rotatable spindle 31 is altered through the action of the photocells 32 and 33. A portion of the line being traced by the tracer head is presented to the photocells 32 and 33 which balance thereon. As the line changes direction, the portion presented to the photocells will similarly change direction causing a shading of one or the other of the cells 32 and 33. The photocell signals 62 from the cells 32 and 33 will reflect the shading of one of the cells to generate a steering error signal at 55 as described in U.S. Pat. No. 3,493,762. This error signal is applied to a bi-directional servo motor 56 which is connected to the rotatable spindle 31 by a belt 57. The motor 56 rotates in response to an error signal at 55, the direction and amount being dependent upon the particular signal with this rotation being transmitted by the belt 57 to the rotatable spindle 31. The rotation of the rotatable spindle 31 will continue until such time as the cells 32 and 33 are again balanced on the line portion which is presented to them with the orientation of the rotatable spindle then remaining unaltered until the direction of the line again changes.

The portion of the control system of FIG. 3 thus far explained operates to move a tracing head along a line being traced under the control of the tracer controls 40 and 42 and similarly controls a slave machine such as by moving a workpiece under the control of the slave controls 45 and 47. These slave controls 45 and 47 will continue to move the workpiece in the same direction until such time as the line being traced by the tracer head itself changes direction. At that time, an error signal is generated at 55 causing a reorientation of the rotatable spindle 31 through the action of the motor 56. This reorientation of the rotatable head 31 causes a change in the steering direction signal 35 thereby producing a change in both of the slave controls 45 and 47. The manner of driving the tracer head and workpiece is known to the prior art, one example being through the use of lead screws.

FIG. 3 also illustrates a power supply 19 similar to that illustrated in FIG. 1. The details of the power supply 19 are dependent upon the particular form of electrically induced erosion being employed and its selection is well known to the prior art. Also, the nozzle 22, supply spool 12 and other standard portions of a wire electrode electrical machining device are not shown, they being standard and their selection and implementation being well known to those with ordinary skill in the art. The power supply 19 has a pair of terminals 58 and 59, the terminal 59 being electrically connected to the workpiece 10 as by a conductor 63 and the terminal 58 being connected to the feed roller 17 as by a conductor 64. This form of connection to the workpiece and electrode is intended as being illustrative only inasmuch as the connection can be made in many alternative places on the electrode system. As is also known to the prior art, the gap length may be sensed by tapping across the terminals 58 and 59 of the power supply 19 to generate a gap voltage signal at 60. The gap voltage signal 60 is transmitted to a drive control 61 which is connected to the steering error signal 55 and the analog switches 41 and 43 for the purpose of disabling and enabling, in prescribed manner, the continuation of the tracing operation and the movement of the workpiece with respect to the electrode. The photocell signals at 62 are also applied to the drive control 61 for reasons to be described below.

The electrode 11 is inclined in the manner illustrated in FIG. 2 by electrode guides 65 and 66, the guides being displaced in opposing directions from each other from a vertical line passing through the point 30. The electrode guides 65 and 66 are held in position on the ends of lever arms 67 and 68 which are connected for rotation with pulleys 70 and 71. As stated with respect to FIG. 2, the electrode 11 is inclined within a plane which is displaced by 90° from the direction of relative motion 25 between the electrode 11 and workpiece 10. The pulley 70 is connected by a timing belt 72 to a second pulley 73 while the pulley 71 is connected by a timing belt 74 to a pulley 75. The pulleys 73 and 75 are mounted on a shaft 76 to which a pulley 77 is attached. The pulley 77 is connected to a motor 78 similar to the motor 56 by means of a belt 79. The steering error signal 55 is applied to the motor 78 for the purpose of rotating the guides 65 and 66 upon a change in the signals applied to the slave controls 45 and 47. To assure the maintenance of the 90° displacement between the inclination place of the electrode 11 and the direction 25, synchro transformers may be used to interconnect the servo motors 56 and 78 in known manner. Alternatively, the motors 56 and 78 may be stepping motors whose angular displacement under the control of the steering error signal 55 may be selected such that the 90° displacement between the electrode inclination plane and direction 25 are automatically maintained. Other synchroinzing techniques may be similarly employed consistent with the stated purpose of the synchronization, the particular technique forming no part of the present invention.

In operation, and assuming a gap length equal to or greater than a preselected value, the tracer controls 40 and 42 and the slave controls 45 and 47 will be enabled through the analog switches 41 and 43 and the X and Y drive components generated through the steering direction signal 25, resolver 36 and analog multipliers 37 and 38 will be applied thereto. When the direction of the line being traced changes, the rotatable spindle 31 will be reoriented by the servo motor 56 under the control of the steering error signal 55 thus altering the X and Y axis drive components. Similarly, the steering error signal will be applied to the servo motor 78 thus rotating the electrode guide 65 and 66 to maintain the plane in which the electrode 11 is inclined at 90° from the new steering direction 25. As can be seen in FIG. 3, the rotation of the electrode guides 65 and 66 will move some portions of the electrode 11 relative to the workpiece 10 more than others. This action may result in a lowering of the gap length below the preselected value which fact is communicated through the gap voltage signal 60 to the drive control 61. This condition causes the drive control 61 to disable the steering error signal 55 and the analog switches 41 and 43 thereby preventing further motion of the electrode relative to the workpiece 10. The electrode 11 and workpiece 10 remain stationary while erosion continues until such time as the gap length again equals or exceeds the preselected value at which time the drive control 61 sequentially enables the steering error signal 55 and the analog switches 41 and 43 in a manner to be described below. Essentially, the drive control 61 will first enable the steering error signal 55 thereby allowing a reorientation of the rotatable spindle 31 and a rotation of the electrode guides 65 and 66. If this rotation reduces the gap length below the preselected value, the drive control 61 will again disable the steering error signal 55. However, if a completed reorientation of the rotatable spindle 31 does not reduce the gap length below the preselected value, the drive control 61 will then enable the analog switches 41 and 43 thereby re-establishing a relative motion between the workpiece 10 and electrode 11 under the control of the slave controls 45 and 47.

Figure 4:
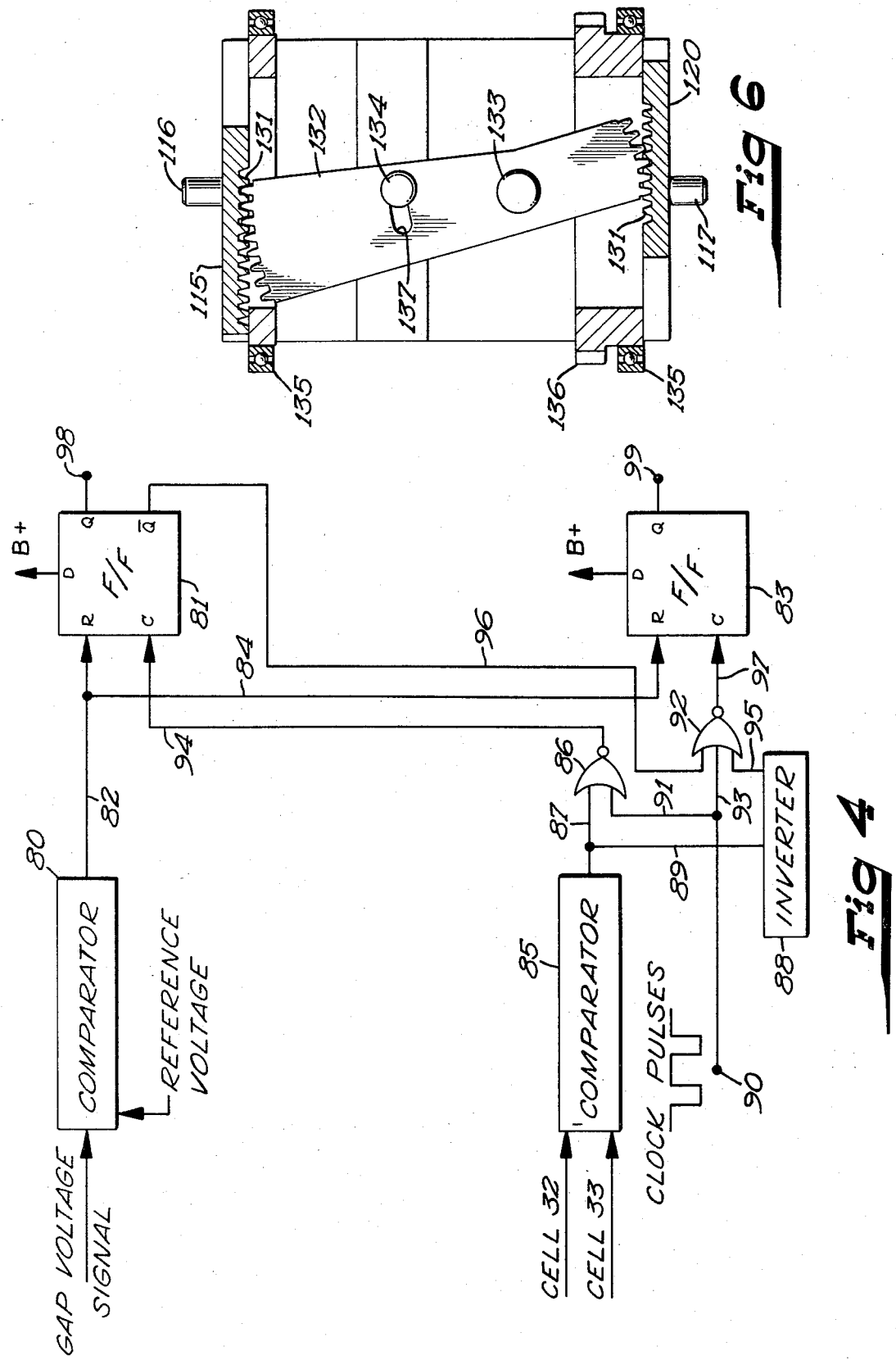
FIG. 4 is a block diagram of a portion of the control system of FIG. 3.

Referring now to FIG. 4, there is shown a block diagram of a preferred embodiment of the drive control 61 of FIG. 3. Specifically, a comparator 80 has its output transmitted to the reset terminal of a flip-flop 81 by a line 82 and to the reset terminal of a flip-flop 83 by a line 84. A second comparator 84 has its output applied to a two pin NOR gate 86 by a line 87 and to an inverter 88 by a line 89. A terminal 90 is connected to a three pin NOR gate 92 by a line 93 and to the two pin NOR gate 86 by a line 91. The output of the NOR gate 86 is applied to the C terminal of flip-flop 81 by a line 94. The output of the inverter 88 is applied to the three pin NOR gate 92 by a line 95 while a line 96 connects the Q̄ terminal of flip-flop 81 to the NOR gate 92. The output of the NOR gate 92 is connected to the C terminal of flip-flop 83 by a line 97. The Q outputs of flip-flops 81 and 83 are connected to terminals 98 and 99 while their D terminals have a positive voltage applied thereto.

The flip-flops 81 and 83 are of the type such that when the reset terminal (R) is high, the flip-flop responds to positive signals applied to the C terminal by making the Q terminal identical to the D terminal. A low at R resets the flip-flop leaving Q low regardless of the conditions at D or C. A high appearing at the output terminal 98 enables the steering error signal 55 in known fashion while a high appearing at the output terminal 99 enables the analog switches 41 and 43 thereby permitting a relative motion between the workpiece 10 and electrode 11 under the control of the slave controls 45 and 47.

The differential comparator 80 has as an input the gap voltage signal generated at 60 in FIG. 3. Applied as a second input is a reference voltage which may be manually altered. This reference serves to control and preselect the gap voltage at which the device will operate thereby preselecting the gap between the workpiece and electrode. When the gap voltage equals or exceeds the reference voltage, the output of the differential comparator 80 will be high. The differential comparator 85 has its input signals from the cells 32 and 33. When these signals equal each other indicating a proper orientation of the rotatable spindle 31, the output of the differential comparator 85 will be high. Conversely, when one of the cells 32 or 33 is shaded indicating a misorientation of the rotatable spindle, differential comparator 85 will have a low output. A series of negative clock pulses are applied to the terminal 90 as a frequency of 1,000 Hz, for example.

In operation, and assuming a gap voltage below the reference voltage, differential comparator 80 will have a low output. This low is applied to the reset terminals of flip-flops 81 and 83 thereby leaving their respective Q terminals low. Thus, terminals 98 and 99 will be low and steering error signal 55 and analog switches 41 and 43 will be disabled. Erosion will continue with the workpiece 10 and electrode 11 stationary with respect to each other until such time as the gap voltage increases to equal or exceed the reference voltage. At that point, the output of differential comparator 80 will go high thereby applying a high to the reset terminal of flip-flops 81 and 83 making them responsive to positive signals applied to their C terminal. Assuming an imbalance or unequal shading of the cells 32 and 33, the output of the differential comparator 85 will be low which low is applied to the NOR gate 86 thereby causing it to transmit the negative going clock pulses applied at terminal 90 as positive going clock pulses on line 94. The first of the positive going clock pulses appearing at the C terminal of flip-flop 81 after its reset terminal has gone high causes flip-flop 81 to apply the positive or high voltage at its D terminal to its Q terminal and thus to output terminal 98. The low appearing at the $\overline{Q}$ terminal of flip-flop 81 is applied by line 96 to NOR gate 92. Also, the low output of differential comparator 85 is inverted at 88 and applied as a high to NOR gate 92. Thus, the output of NOR gate 92 is low which low is applied to the C terminal of flip-flop 83 leaving its Q terminal and output terminal 99 low. In this condition, the steering error signal 55 is enabled while the analog switches 41 and 43 remain disabled. With steering error signal 55 enabled, servo motor 56 is allowed to rotate to properly orient the rotatable spindle 31 while servo motor 78 rotates to maintain the proper angular relationship between the inclined electrode 11 and steering direction 25. If, during the rotation of the servo motor 78, the gap length should fall below the preselected value established by the reference voltage, the output of differential comparator 80 will again go low disabling the steering error signal 55 until such time as the gap length again equals or exceeds the gap length established by the reference voltage. Assuming, that the rotatable spindle has properly oriented itself without disabling the steering error signal 55, a high will appear as the output of differential comparator 85. This high when applied to NOR gate 86 causes a low to be applied to the C terminal of flip-flop 81. However, since flip-flop 81 has been previously set, its Q terminal will remain high as will output terminal 98 while the low appearing at its $\overline{Q}$ terminal will continue to be applied to the NOR gate 92. The high appearing as the output of differential comparator 85 will be inverted at 88 and applied as a low to NOR gate 92. With lines 95 and 96 both low, the negative pulses appearing at terminal 90 will be inverted by NOR gate 92 and applied as positive going pulses by line 97 to the C terminal of flip-flop 83 thereby causing flip-flop 83 to apply the positive or high appearing at its D terminal to its Q terminal and terminal 99. In this condition, both terminals 98 and 99 are high and the steering error signal 55 and the analog multiplier 41 and 43 are enabled.

From the above, it is apparent that so long as the gap voltage remains equal to or greater than a preselected value established by the reference voltage input to comparator 80, the steering error signal 55 and analog switches 41 and 43 will be enabled. When the gap voltage falls below the preselected value, all motion between the electrode and workpiece will be prevented until such time as the gap voltage equals or exceeds the preselected value. At that time, the steering error signal is enabled first to properly orient the electrode with respect to the workpiece and once that orientation has been accomplished the relative motion between the electrode and the workpiece is reestablished when the slave control is enabled.

Figure 5:
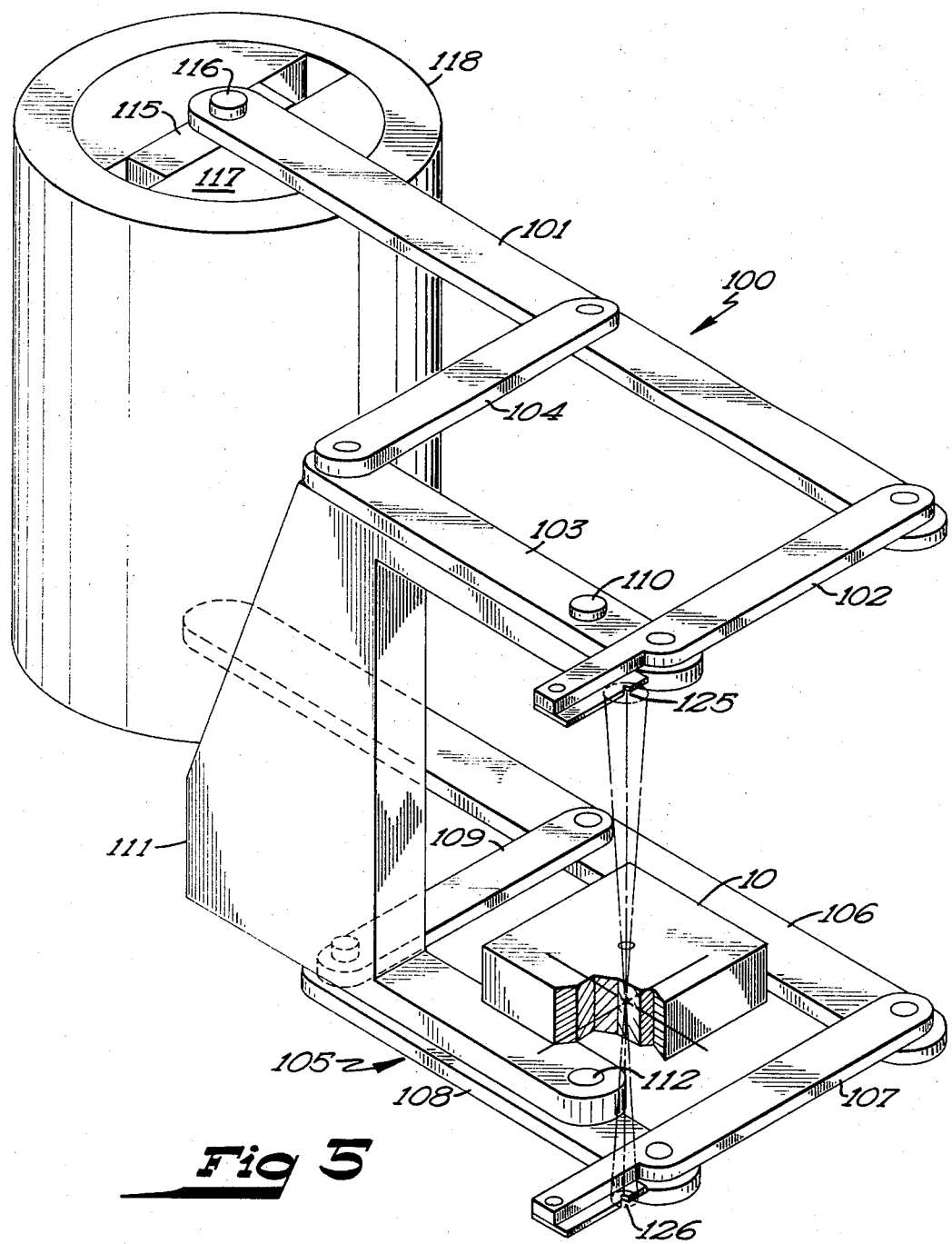
FIG. 5 is another preferred embodiment of a portion of the present invention.

Referring now to FIG. 5, there is shown an additional preferred embodiment for a method of rotating the electrode guides. Specifically, there is shown an upper pantograph 100 composed of linkages 101, 102, 103 and 104 and a lower pantograph 105 composed of linkages 106, 107, 108, and 109. A pantograph is a well known mechanical linkage system having the capability of reproducing a mechanical action imparted to one of its linkages at a point spaced from the point at which that action occurs. This may be on a one-to-one ratio or the reproduced action may be an enlargement or a reduction of the mechanical action depending upon the relationship between the linkages comprising the pantograph. The upper pantograph 100 has a pin 110 about which it pivots with respect to a support 111. Spaced immediately below and on the axis of the pin 110 is a pin 112 around which the lower pantograph 105 pivots. One end of the linkage 101 of the upper pantograph 100 is pivotally connected to a cross slide 115 by means of a pin connection 116. The cross slide 115 is moveable across the diameter of a rotor 117, the rotor being supported for rotation with respect to a body member 118. The corresponding end of the linkage 106 of the lower pantograph 105 is pivotally connected to a cross slide 120 by means of a pin 121 (see FIG. 6). With the cross slides 115 and 120 positioned such that the pins 116 and 121 lie at the center of the rotor 117, rotation imparted to the rotor 117 will have no effect upon the pantograph. Taking the pantograph 100 as an example, as the cross slide 115 moves off center, a rotation imparted to the rotor 117 will cause the pantograph to reproduce at a point 125 circular motion of the linkage 101 at its pin connection 116. Similar results are obtained for the pantograph 105 with respect to a point 126. With the points 125 and 126 functioning as electrode guides, it can be seen that the pantographs 100 and 105 operating together are capable of moving an electrode guided at the points 125 and 126 in the manner illustrated in FIG. 2. Further, inasmuch as the cross slides 115 and 120 are adjustable, a circle which forms the base of the cone can be adjusted thereby allowing an adjustment in the amount of inclination of the electrode. This adjustment in inclination is equivalent to an adjustment of $\Delta_1$ and $\Delta_2$ shown in FIG. 2. For purposes of illustration, the vertex of the cone generated by the pantographs 100 and 105 is shown at the underside of the workpiece 10. While the vertex may be on the upper or lower surface, it is more practical to maintain the vertex at the lower surface which surface can be maintained in the same position with respect to the electrode without regard to the thickness of the workpiece 10. That is, by placing the workpiece 10 on a table, the lower surface of the workpiece 10 will be in the same vertical position with respect to the upper and lower pantograph without regard to its thickness. Also, in FIG. 5 the distance between the lower surface of the workpiece 10 and the lower pantograph 105 is illustrated as being less than the distance between the lower surface of the workpiece 10 and the upper pantograph 100. It is to be understood that these different distances require different ratios within the pantographs 100 and 105, the determination of those ratios being within those skilled in the art.

With an electrode guide system constructed in accordance with the embodiment of FIG. 5, it is possible to produce a compound angle by electrically induced erosion with a wire electrode. By maintaining the vertex of the cone generated by the rotation of the electrode at a particular point in the cross section (preferably the upper or lower surface) of the workpiece it is possible to cut the workpiece such that a pattern followed by the electrode on one of the surfaces of the workpiece directly corresponds to the pattern being traced by the tracing head with the pattern on the other surface being larger or smaller by a predetermined amount depend upon the inclination direction of the electrode. Further, by utilizing the offset feature known to the prior art and described in U.S. Pat. No. 3,493,762 it is possible to exactly reproduce a pattern without having to make any compensation in the pattern for the working reach of the electrode.

Figure 7:
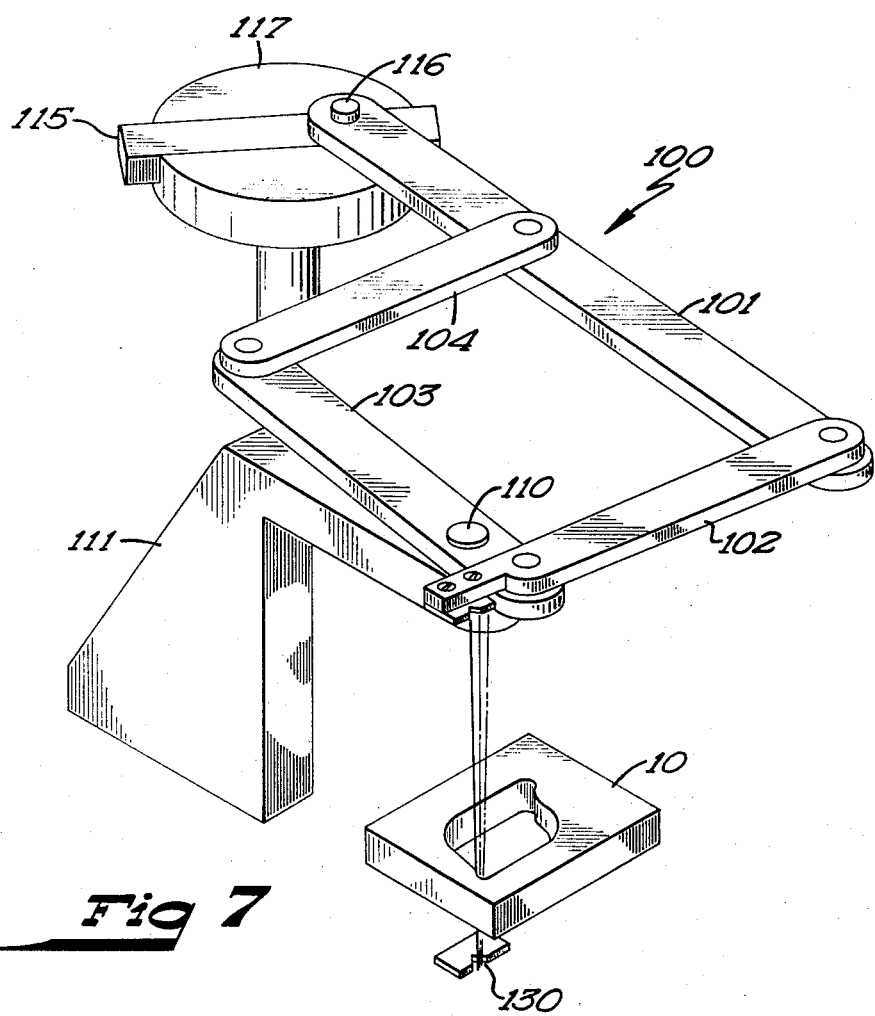
FIG. 7 is a further preferred embodiment of a portion of the preferred embodiment.

Indeed, the offset feature enables the utilization of a single pantograph to accomplish the same results which were obtained in the double pantograph embodiment. This is illustrated in FIG. 7 wherein the upper pantograph 100 is illustrated connected to a cross slide 115 by a pin 116 in a manner similar to that illustrated in FIG. 5. In this embodiment, the lower pantograph has been replaced by a fixed electrode guide 130. Inasmuch as the electrode inclination is produced by the pantograph 100 through a displacement of one end of the electrode in a direction displaced by 90° from the direction of relative movement between the workpiece and the electrode 25, and the offset system known to the prior art works in the same direction, it is possible to accomplish the same results with a single pantograph through the proper application of the offset system described in U.S. Pat. No. 3,493,762. Essentially, this is accomplished by setting the pantograph 100 to produce the desired angle of inclination in the electrode and then utilizing the offset system to compensate for both the working reach of the electrode and the displacement of the electrode produced by its inclination. The inclination displacement compensation may be accomplished for any point in the cross-section of the workpiece although the most usual compensation is made for the bottom surface.

Referring now to FIG. 6, there is shown a device for correlating the movements of the pins 116 and 121 and thus the motions imparted to the electrode by the upper pantograph 100 and the lower pantograph 105. Specifically, the slides 115 and 120 with their extending pins 116 and 121 are shown slideable across a generally cylindrical rotor 117. The slides 115 and 120 are provided with racks 131 for cooperation with the teeth of a pivoted lever arm 132. The lever arm 132 pivots about a pin 133 which is offset from the center of the lever arm to compensate for the different distances between the upper and lower pantograph and the lower surface of the workpiece. The lever arm 132 has a slot 136 through which a thumbscrew 134 passes which thumbscrew threadedly engages the side of the rotor 117 to hold the lever arm in position in a known manner. By loosening the thumbscrew 134, the lever arm may be pivoted around the pin 133 thereby moving the slides 115 and 120 and their cooperating pins 116 and 121 to effect an adjustment in the motion of the pantographs 100 and 105 in known manner. The rotor 117 is to be positioned within a body such as the body member 118 and is adapted for rotation therein by means of bearings 135. The rotational motion may be imparted to the rotor 117 in any known manner as through engagement with gear teeth 136 it being important only that that rotation be controlled as through a servo motor and synchro transformer as discussed above with respect to servo motor 78 in FIG. 3. Further, access to the lever arm 132 may be provided in any convenient manner as through the side wall of body member 118.

Obviously, many modifications and variations of the present invention are possible in light of the above teachings. An example of such a modification is the use of an alternative source of directional indications for the slave controls 45 and 47. Such an alternative may take the form of a punched or magnetic tape of the desired relative movement between the workpiece and electrode, the tape having a record approximately the equivalent of the output of the resolver 36. The utilization of such a record within the present invention is within the capabilities of those skilled in the art. It is therefore to be understood that, within the scope of the appended claims, the invention may be practiced otherwise than as specifically described.

What is claimed is:

1. In combination, a tracer and tracer control device for controlling the electrically induced cutting of a workpiece, the combination comprising:
    means responsive to the direction of successive portions of a line to be traced for generating a first signal indicative of the direction of said line portions and a second signal indicative of an error in said first signal;
    means responsive to said second signal and operatively connected to said line portion responsive means for altering said first signal;
    wire electrode means;
    means for producing a relative movement between said workpiece and wire electrode means in accordance with said first signal;
    means for inclining said wire electrode means within a plane; and
    means responsive to said second signal for maintaining the plane of said inclined electrode means at right angles to said direction of relative movement between said workpiece and said inclined electrode means.

2. The combination of claim 1 wherein said inclining means comprises first electrode guide means lying within said plane and spaced from one surface of said workpiece, said plane maintaining means comprising means for orbiting said first electrode guide means about a generally vertical line within said plane.

3. The combination of claim 2 wherein said first electrode guide means orbiting means comprises pantograph means.

4. The combination of claim 3 further comprising means for incorporating an offset signal into said first signal.

5. The combination of claim 3 wherein said inclining means comprises second electrode guide means lying within said plane and spaced from another surface of said workpiece, said plane maintaining means comprising means for orbiting said second electrode guide means about said generally vertical line.

6. The combination of claim 5 further comprising means for incorporating an offset component into said first signal.

7. The combination of claim 1 wherein said inclining means comprises first and second electrode guide means within said plane and spaced from opposing surfaces of said workpiece, said plane maintaining means comprising means for orbiting at least one of said first and second electrode guide means about a generally vertical line within said plane.

8. The combination of claim 7 further comprising means responsive to the gap between said workpiece and said wire electrode means for controlling said relative movement producing means and said plane maintaining means.

9. The combination of claim 8 wherein said gap responsive means comprises means for preventing movement between said workpiece and wire electrode means when said gap becomes smaller than a preselected value.

10. The combination of claim 8 wherein said gap responsive means comprises means for disabling said plane maintaining means and said relative movement producing means when said gap becomes smaller than a preselected value.

11. The combination of claim 10 wherein said gap responsive means comprises means for sequentially enabling said plane maintaining means and said relative movement producing means.

12. The combination of claim 11 wherein said inclining means comprises means for orbiting both said first and second electrode guide means about said generally vertical line.

13. The combination of claim 11 further comprising means for incorporating an offset component into said first signal.

14. The combination of claim 13 wherein said inclining means comprises means for orbiting both said first and second electrode guide means about said generally vertical line.

15. A device for controlling the electrically induced cutting of a workpiece which comprises:
   inclined wire electrode means;
   a source of directional indications;
   means for producing a relative movement between said workpiece and inclined electrode means in accordance with said directional indications;
   means for detecting a change in said directional indications;
   electrode guide means spaced from opposing sides of said workpiece, at least one of said electrode guide means being orbitable in a generally circular arc in response to said change detecting means; and
   drive control means responsive to the gap between said workpiece and said inclined electrode means for disabling said relative movement producing means and said orbitable electrode guide means when said gap becomes smaller than a preselected value, said drive control means including means for sequentially enabling said orbital electrode guide means and said relative movement producing means when the gap is at least equal to said preselected value.

16. The device of claim 15 wherein said means for sequentially enabling comprises means for enabling said orbitable electrode guide means when said gap is at least equal to said preselected value.

17. The device of claim 16 wherein said means for sequentially enabling comprises means for enabling said relative movement producing means in the absence of a change in said directional indications and maintaining said enabled conditions so long as said gap is at least equal to said preselected value.

18. The device of claim 17 wherein said source of directional indications comprises means for incorporating an offset component into said indications.

19. The device of claim 18 wherein there are two electrode guide means each orbitable in a generally circular arc in response to said change detecting means such that said inclined wire electrode means moves in a conical path.

20. The device of claim 19 wherein the vertex of the cone defined by said conical path is in the same operative position with respect to said workpiece as it would otherwise be in if the wire electrode means were not inclined.

21. A device for controlling the electrically induced erosion of a workpiece which comprises:
   wire electrode means;
   a record of the desired direction of relative movement between said workpiece and said wire electrode means;
   means responsive to said record for producing a first signal indicative of the relative movement direction of said record and a second signal indicative of a change in the relative movement direction of said record;
   means responsive to said second signal and operatively connected to said record responsive means for altering said first signal;
   wire electrode means;
   means for producing a relative movement between said workpiece and wire electrode means in accordance with said first signal;
   means for inclining said wire electrode means within a plane;
   means responsive to said second signal for maintaining the plane of said inclined electrode means at right angles to the direction of relative movement between said workpiece and said inclined electrode means; and
   drive control means responsive to the gap between said workpiece and said inclined electrode means for disabling said relative movement producing means and said plane maintaining means when the gap becomes smaller than a preselected value, said drive control means including means for sequentially enabling said plane maintaining means and said relative movement producing means when the gap is at least equal to said preselected value.

22. A device for controlling the electrically induced erosion of a workpiece which comprises:
   wire electrode means;
   a record of the desired direction of relative movement between said workpiece and said wire electrode means;
   means responsive to said record member for producing a relative movement between said workpiece and said wire electrode means in accordance with the relative movement directions thereon;
   means for inclining said wire electrode means within a plane;
   means responsive to said record member for maintaining the plane of said wire electrode means at right angles to the direction of relative movement between said workpiece and said wire electrode means; and drive control means responsive to the gap between said workpiece and said inclined electrode means for disabling said relative movement producing means and said plane maintaining means when the gap becomes smaller than a preselected value, said drive control means including means for sequentially enabling said plane maintaining means and said relative movement producing means when the gap is at least equal to said preselected value.

23. The device of claim 22 further comprising offset signal means, said relative movement producing means comprising means for incorporating said offset signal into the relative movement directions of said record member.

* * * * *